United States Patent
Garg et al.

(10) Patent No.: US 11,372,683 B2
(45) Date of Patent: *Jun. 28, 2022

(54) PLACEMENT OF VIRTUAL GPU REQUESTS IN VIRTUAL GPU ENABLED SYSTEMS USING A REQUESTED MEMORY REQUIREMENT OF THE VIRTUAL GPU REQUEST

(71) Applicant: VMWARE, INC., Palo Alto, CA (US)

(72) Inventors: Anshuj Garg, Jabalpur (IN); Uday Pundalik Kurkure, Los Altos Hills, CA (US); Hari Sivaraman, Livermore, CA (US); Lan Vu, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 353 days.

This patent is subject to a terminal disclaimer.

(21) Appl. No.: 16/550,313

(22) Filed: Aug. 26, 2019

(65) Prior Publication Data
US 2021/0011773 A1    Jan. 14, 2021

(30) Foreign Application Priority Data
Jul. 12, 2019    (IN) .............. 201941028020

(51) Int. Cl.
*G06F 9/46* (2006.01)
*G06F 9/50* (2006.01)
*G06F 9/455* (2018.01)

(52) U.S. Cl.
CPC ........ *G06F 9/5044* (2013.01); *G06F 9/45558* (2013.01); *G06F 9/5016* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,713,574 B2 * | 4/2014 | Creamer ............... | G06F 9/5061 718/104 |
| 10,255,652 B2 * | 4/2019 | Featonby .............. | G06F 9/5044 |
| 2018/0130171 A1 | 5/2018 | Prakash et al. | |
| 2019/0019267 A1 * | 1/2019 | Suresh .................. | G06F 9/5077 |
| 2021/0194674 A1 | 6/2021 | Chen et al. | |

* cited by examiner

*Primary Examiner* — Bing Zhao
(74) *Attorney, Agent, or Firm* — Thomas Horstemeyer, LLP

(57) ABSTRACT

Disclosed are aspects of memory-aware placement in systems that include graphics processing units (GPUs) that are virtual GPU (vGPU) enabled. Virtual graphics processing unit (vGPU) data is identified for graphics processing units (GPUs). A configured GPU list and an unconfigured GPU list are generated using the GPU data. The configured GPU list specifies configured vGPU profiles for configured GPUs. The unconfigured GPU list specifies a total GPU memory for unconfigured GPUs. A vGPU request is assigned to a vGPU of a GPU. The GPU is a first fit, from the configured GPU list or the unconfigured GPU list that satisfies a GPU memory requirement of the vGPU request.

20 Claims, 4 Drawing Sheets

PLACEMENT OF VIRTUAL GPU REQUESTS IN VIRTUAL GPU ENABLED SYSTEMS USING A REQUESTED MEMORY REQUIREMENT OF THE VIRTUAL GPU REQUEST

RELATED APPLICATIONS

Benefit is claimed under 35 U.S.C. 119(a)-(d) to Foreign Application Serial No. 201941028020 filed in India entitled "MEMORY-AWARE PLACEMENT FOR VIRTUAL GPU ENABLED SYSTEMS", on Jul. 12, 2019, by VMWARE, Inc., which is herein incorporated in its entirety by reference for all purposes.

The present application is related in subject matter to U.S. patent application Ser. No. 16/550,327, which is incorporated herein by reference.

BACKGROUND

A cluster can include a collection of hosts in which processor, memory, storage, and other hardware resources are aggregated for utilization. A host is capable of running one or more virtual computing instances, such as virtual machines. A virtual machine can include an operating system (OS) running one or more applications. Virtual machines running on a host can utilize host resources. However, if a virtual machine is placed on a host with insufficient resources available to meet the resource demands of the virtual machines, the host becomes overloaded.

In some existing solutions, one or more virtual machines on an overloaded host can be relocated to a different host in the cluster in an attempt to remediate the overloaded host. A scheduling service is utilized in some systems to select a host for placement of virtual machines and balance the resource utilization among the hosts in the cluster. However, these placement decisions are frequently made based on insufficient information regarding resource demands of the virtual machines and resource availability of the hosts. This can result in sub-optimal placement of virtual machines, unbalanced hosts, network saturation, overloading of network links, and/or overall inefficient utilization of available resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to memory-aware placement in systems that include graphics processing units (GPUs) that are virtual GPU (vGPU) enabled. Virtual GPU enabled systems can include data centers, cloud computing services, and other computing environments. These systems can process vGPU requests of virtual machines and assign the vGPU requests to GPUs in a vGPU enabled system. As a result, multiple virtual machines can use a vGPU enabled GPU at the same time. Existing systems can result in sub-optimal placement of virtual machines by failing to consider sufficient information regarding specific GPU resource demands of the virtual machines. However, as disclosed herein, a solution can be provided to improve the performance of vGPU enabled systems, for example, by minimizing a number of GPUs utilized in consideration of the GPU memory requirements of vGPU requests and the vGPU profiles of the GPUs.

Figure 1:
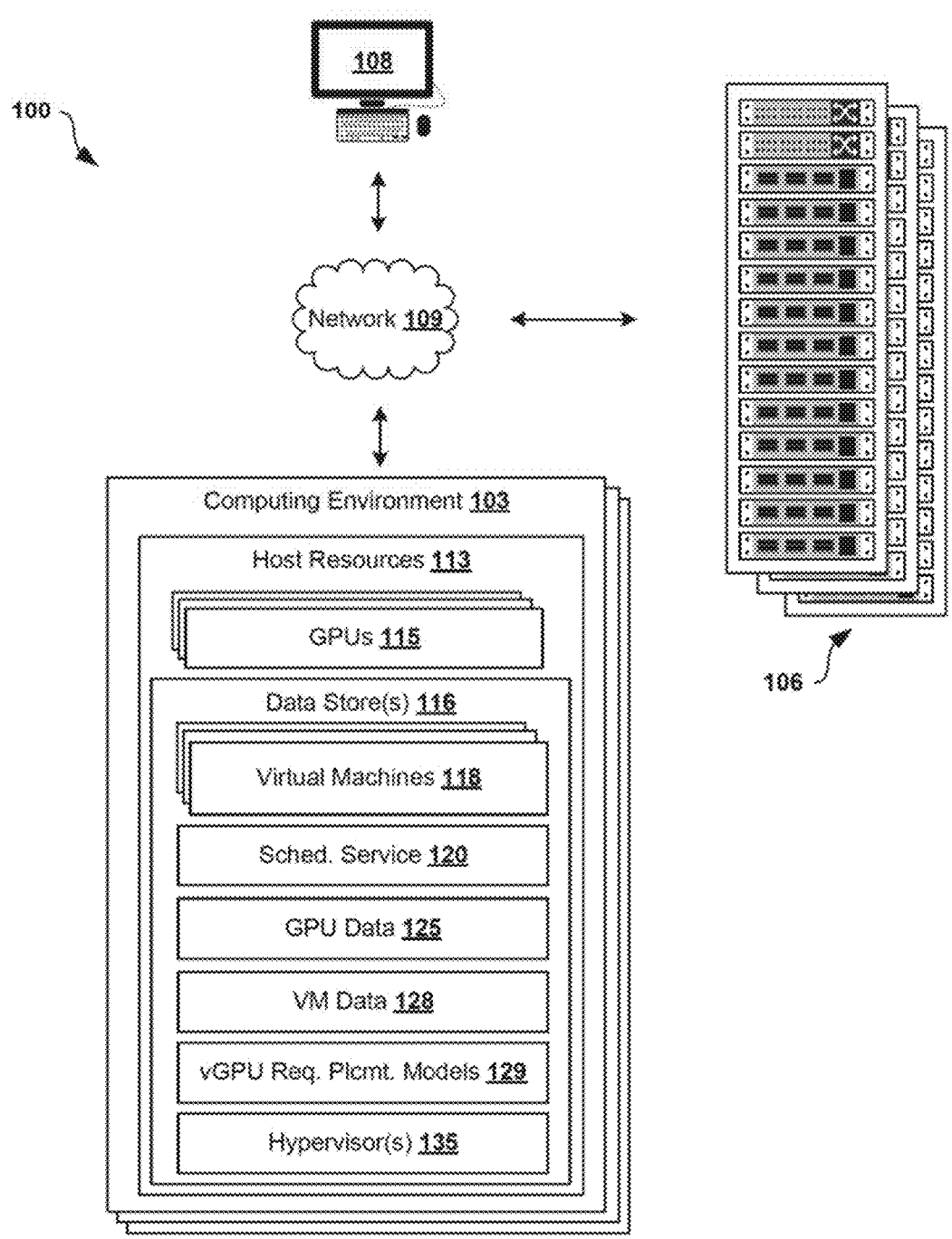
FIG. 1 is a block diagram illustrating an example of a networked environment that includes a computing environment, a client device, and other components in communication over a network.

With reference to FIG. 1, an example of a networked environment 100 is shown. The networked environment 100 can include a computing environment 103, various clusters 106, and on or more client devices 108 in communication with one another over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

The computing environment 103 can include host resources 113. The host resources 113 can include processors, GPUs 115, data stores 116, and other hardware resources installed in hosts or physical machines of the computing environment 103. In some examples, the computing environment 103 can include an enterprise computing environment that includes hundreds or even thousands of physical machines, virtual machines, and other software implemented in devices stored in racks, distributed geographically and connected to one another through the network 109. It is understood that any virtual machine or virtual appliance is implemented using at least one physical device.

The computing environment 103 can include, for example, a server or any other system providing computing capability and other host resources 113. Alternatively, the computing environment 103 can include one or more computing devices that are arranged, for example, in one or more server banks, computer banks, clusters, or other arrangements. The computing environment 103 can include a grid computing resource or any other distributed computing arrangement. The computing devices can be located in a single installation or can be distributed among many different geographical locations. Although shown separately from the clusters 106, in some examples, the clusters 106 can be a portion of the computing environment 103. Various applications can be executed on the computing environment 103. For example, a scheduling service 120 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the clusters 106 and client devices 108 for end users over the network 109, sometimes remotely, the computing environment 103 can be described as a remote computing environment 103 in some examples. Additionally, in some examples, the computing environment 103 can be implemented in hosts of a rack of the computer clusters 106, and can manage operations of a virtualized computing environment.

The GPUs 115 can be vGPU-enabled, or support vGPUs. For example, NVIDIA® vGPU solutions can allow multiple virtual machines 118, or workloads, to share a GPU 115 with a balance among performance, security and isolation. In vGPU mode or mediated pass-through mode, virtual machines 118 time-share the GPU 115 resources by time-slicing and hardware preemption based on vGPU-enabled architectures such as the NVIDIA® Pascal architecture. In any given time slice, only one virtual machine 118 runs on a GPU 115. All GPU cores of the GPU 115 are given to this virtual machine 118 during the time slice, even if it does not use all of the cores. The GPU internal memory can be statically partitioned based on a vGPU profile. For example, NVIDIA® Tesla P100 16 GB GPU 115 can support 1 GB, 2 GB, 4 GB, 8 GB, and 16 GB vGPU profiles. The profiles can equally divide the total GPU memory of the GPU 115 into sections or partitions according to the memory size of the vGPU profile. When configured with a 1 GB profile, an NVIDIA® Tesla P100 can support up to 16 virtual machines 118, each provided with 1 GB of the total 16 GBs of the NVIDIA® Tesla P100 GPU 115. The NVIDIA® Tesla P100 GPU 115 can support up to 8 virtual machines 118 using the 2 GB profile, 4 virtual machines 118 using the 4 GB profile, 2 virtual machines 118 using the 8 GB profile, and a single virtual machine 113 using the 16 GB profile.

An NVIDIA® Tesla P40 24 GB GPU 115 can support 1 GB, 2 GB, 3 GB, 4 GB, 6 GB, 8 GB. 12 GB, and 24 GB vGPU profiles. When configured with a 1 GB profile, an NVIDIA® Tesla P40 can support up to 24 virtual machines 118, each provided with 1 GB of the total 24 GBs of the NVIDIA® Tesla P40 GPU 115. The NVIDIA® Tesla P40 GPU 115 can support up to 12 virtual machines 118 using the 2 GB profile, 8 virtual machines 118 using the 3 GB profile, 6 virtual machines 118 using the 4 GB profile, 4 virtual machines 118 using the 6 GB profile, 2 virtual machines 118 using the 12 GB profile, a single virtual machine 118 using the 24 GB profile.

NVIDIA® vGPU can include three policies that determine how time slices are allocated, including best effort, equal share, and fixed share. In best effort policy, each virtual machine 118 or workload can use GPU cycles until its time slice is over, or until its job queue is empty. That is, GPU cycles are distributed among all virtual machines 118 that are running CUDA applications. For equal share, the amount of cycles given to each vGPU 112 is determined by the current number of virtual machines 118, regardless of whether these virtual machines 118 are running CUDA or GPU-utilizing applications or not. For fixed share, the amount of cycles given to each vGPU 112 is determined by the total number of supported virtual machines 118 under the given profile, regardless of if other virtual machines 118 are powered on or not. In some examples, the best-effort policy can be chosen while using the scheduling service 120.

The data store 116 can include memory of the computing environment 103, mass storage resources of the computing environment 103, or any other storage resources on which data can be stored by the computing environment 103. In some examples, the data store 116 can include one or more relational databases, object-oriented databases, hierarchical databases, hash tables or similar key-value data stores, as well as other data storage applications or data structures. The data stored in the data store 116, for example, can be associated with the operation of the various services or functional entities described below. For example, virtual machines 118, the scheduling service 120, GPU data 125, virtual machine data 128, and vGPU request placement models 129 can be stored in the data store 116.

The scheduling service 120 can work in conjunction with the hypervisor 135 to assign vGPU requests and other graphics workloads or tasks of the virtual machines 118 to GPUs 115. Assignment of a vGPU request can cause the virtual machine 118, or a portion of the virtual machine 118, to be executed using a GPU 115. The scheduling service 120 can identify a graphics processing requirement for a virtual machine 118 as a vGPU request that is to be executed or performed using the host resources 113. The scheduling service 120 can handle the graphics processing requirement or vGPU request of the virtual machine 118 using a vGPU-enabled GPU 115. The scheduling service 120 can utilize the vGPU request placement models 129 to optimize assignment of vGPU requests to GPUs 115. The scheduling service 120 can work in conjunction with the hypervisor 135 to generate a vGPU for the vGPU request, and assign the vGPU request or the associated virtual machine 118 for execution using a vGPU-enabled GPU 115. The vGPU request placement models 129 can include first fit heuristics and an Integer Linear Programming (ILP) model. The vGPU request placement models 129 can be memory-aware models by considering the memory requirements of a vGPU requests as well as the memory reservations of vGPU profiles of a GPU 115.

GPU data 125 can represent information related to GPUs 115, as well as related hardware resources 113. GPU data 125 can include information such as the amount of GPU memory of the GPU 115, a set of supported vGPU profiles for the GPU 115, and a GPU configuration status. The GPU configuration status can indicate whether or not the GPU 115 is currently configured with a particular vGPU profile. If the GPU 115 is configured, the configuration status can also indicate the configured vGPU profile of the GPU 115. GPU data 125 can also include information related to the virtual machines 118 currently executing on each GPU 115, as well as virtual machines 118 scheduled or slated to be executed. GPU data 125 can include a record of the virtual machines 118 assigned to each GPU 115. GPU data 125 can also include vGPUs of the GPUs 115. For each vGPU, the GPU data 125 can include a GPU memory reservation and availability status. The GPU memory reservation can be an amount of GPU memory of the vGPU, according to a configured vGPU profile of the associated GPU 115.

Virtual machine data 128 can represent information related to virtual machines 118. Virtual machine data 128 can include a record of all vGPU requests for the virtual machine 118. A vGPU request can include a graphics processing workload or graphics processing requirement of virtual machine 118. Virtual machine data 128 can include an identifier or name of each virtual machine 118, and an identifier or location of a GPU 115 where a vGPU request or virtual machine 118 is being processed or executed.

The hypervisor 135, which may sometimes be referred to as a virtual machine monitor (VMM), can be an application or software stack that allows for creating and running virtual machines 118, and performing the virtual machines 118 using hardware resources of the computing environment 103. The scheduling service 120 can work in conjunction with the hypervisor 135 to execute the virtual machines 118 on hardware resources that include the GPUs 115. A vGPU manager component can be installed and executed in the hypervisor 135 layer and can virtualize the underlying physical GPUs 115. For example GPUs 115, including NVIDIA® Pascal and others, can offer virtualization for both graphics and GPGPU (CUDA) applications.

A hypervisor 135 can be configured to provide guest operating systems with a virtual operating platform, including virtualized hardware devices or resources, and to manage the execution of guest operating systems within a virtual machine execution space provided on the host machine by the hypervisor 135. In some instances, a hypervisor 135 can be a type 1 or bare metal hypervisor configured to run directly on a host machine in order to control and manage the hardware resources 153. In other instances, the hypervisor 135 can be a type 2 or hosted hypervisor implemented as an application executed by an operating system executed by a host machine. Examples of different types of hypervisors include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

Figure 2:
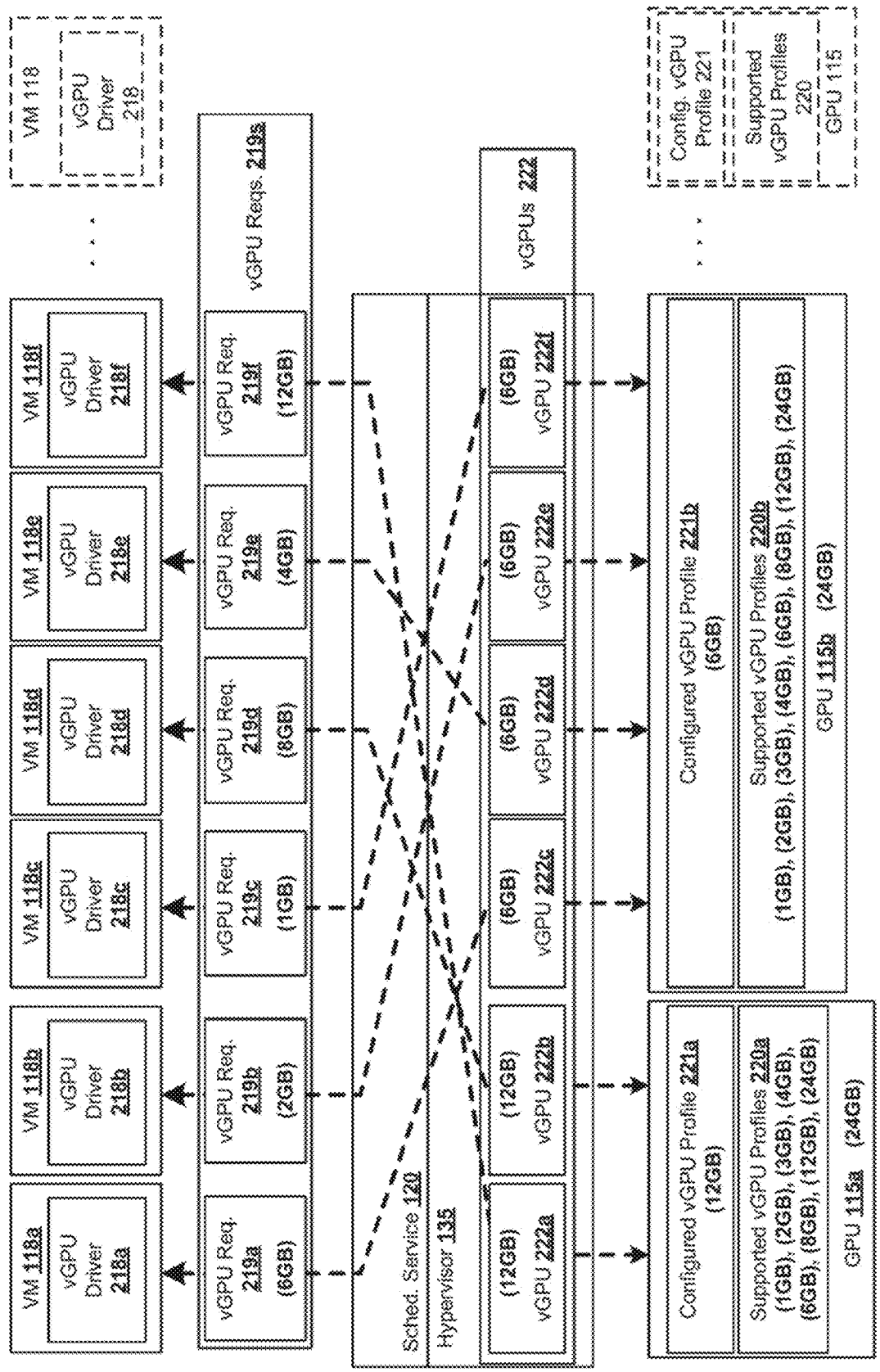
FIG. 2 is a drawing that illustrates an example of functionalities performed using components of the networked environment.

FIG. 2 illustrates an example of the operation of the scheduling service 120 and the hypervisor 135. The scheduling service 120 can assign vGPU requests 219 of virtual machines 118 to execute on selected GPUs 115. The scheduling service 120 can utilize the vGPU request placement models 129 to optimize assignment of vGPU requests 219 to GPUs 115. The scheduling service 120 can work in conjunction with the hypervisor 135 to generate vGPUs 222, and assign the vGPU requests 219 to the vGPUs 222 for execution using a corresponding vGPU-enabled GPU 115.

The virtual machines 118 can include the virtual machines 118a-118f. The virtual machines 118a-118f can include corresponding vGPU drivers 218a-218f, collectively referred to as the vGPU drivers 218. The virtual machines 118a-118f can also include corresponding vGPU requests 219a-219f. The vGPU drivers 218 can be used by virtual machines 118 to control vGPU-enabled GPUs 115. Each of the vGPU requests 219 can include a GPU memory requirement of the corresponding virtual machine 118. For example, vGPU request 219a can have a 6 GB GPU memory requirement, vGPU request 219b can have a 2 GB GPU memory requirement, vGPU request 219c can have a 1 GB GPU memory requirement, vGPU request 219d can have an 8 GB GPU memory requirement, vGPU request 219e can have a 4 GB GPU memory requirement, and vGPU request 219f can have a 12 GB GPU memory requirement.

The GPUs 115 can include GPUs 115a and 115b. In this example, the GPUs 115a and 115b can each have 24 GB of GPU memory. The GPU 115a can include supported vGPU profiles 220a with GPU memory reservations or partitions including 1 GB, 2 GB, 3 GB, 4 GB, 6 GB, 8 GB, 12 GB, and 24 GB. The GPU 115b can include supported vGPU profiles 220b with GPU memory reservations including 1 GB, 2 GB, 3 GB, 4 GB, 6 GB, 8 GB, 12 GB, and 24 GB. Generally, a GPU 115 can include supported vGPU profiles 220 with GPU memory reservations that evenly divide the total GPU memory of the GPU 115. The GPU 115a can include a configured vGPU profile 221a with a GPU memory reservation of 12 GB. The GPU 115b can include a configured vGPU profile 221b with a GPU memory reservation of 6 GB.

The scheduling service 120 can direct the hypervisor 135, and a vGPU manager component of the hypervisor 135, to configure each GPU 115 with a configured vGPU profile 221. The scheduling service 120 can also direct the hypervisor 135, and a vGPU manager component of the hypervisor 135, to create vGPUs 222 for the GPUs 115. Because the GPU 115a has a configured vGPU profile 221a with a GPU memory reservation of 12 GB, the vGPUs 222a and 222b of the GPU 115a can each have a GPU memory reservation of 12 GB. The vGPU requests 219 that include a GPU memory requirement equal to or less than 12 GB can be assigned to the vGPU 222a or 222b of the GPU 115a. Because the GPU 115b has a configured vGPU profile 221b with a GPU memory reservation of 6 GB, the vGPUs 222c-222f of the GPU 115b can each have a GPU memory reservation of 6 GB. The vGPU requests 219 that include a GPU memory requirement equal to or less than 6 GB can be assigned to the vGPU 222a or 222b of the GPU 115a. Generally, a vGPU request 219 with a particular GPU memory requirement can be assigned to a vGPU 222 with a GPU memory reservation greater than or equal to the particular GPU memory requirement. A vGPU 222 can have sufficient GPU memory to support a vGPU request 219 if its vGPU profile specifies a GPU memory reservation greater than or equal to the particular GPU memory requirement of a vGPU request 219.

The scheduling service 120 can use vGPU request placement models 129 to optimize assignment of vGPU requests 219 to vGPUs 222 of GPUs 115 in the computing environment 103. The scheduling service 120 can assign vGPU requests 219 based on an assessment of the GPU data 125 and virtual machine data 128 according to the vGPU request placement models 129.

Figure 3:
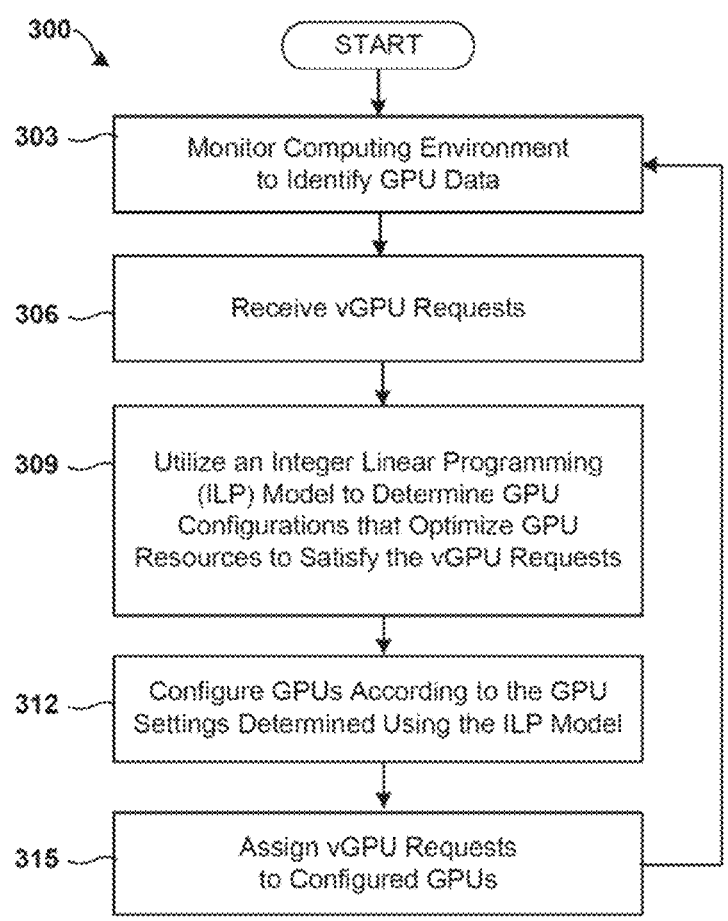
FIG. 3 is a flowchart that illustrates an example of functionalities performed using components of the networked environment.

FIG. 3 shows an example flowchart 300, describing steps that can be performed by instructions executed by the computing environment 103. Generally, the flowchart 300 describes how the scheduling service 120 can optimize usage of GPUs 115 in the computing environment 103 according to a vGPU request placement model 129. The scheduling service 120 can direct the hypervisor 135 and the vGPU manager components to perform aspects of the flowchart 300. The flowchart 300 gives an example of the scheduling service 120 using an Integer Linear Programming (ILP) vGPU request placement model 129 to optimize usage of GPUs 115.

In step 303, the scheduling service 120 can monitor the computing environment 103 to identify GPU data 125. The GPU data 125 can include an identifier for each GPU 115, and can store information of the GPU 115 in association with the GPU 115 in a list, table or another data structure. The GPU data 125 can also include the total amount of GPU memory of a GPU 115, and a set of supported vGPU profiles 220 for a GPU 115. The scheduling service 120 can determine a total number of GPUs 115 or available GPUs 115, and store the number in the GPU data 125.

In step 306, the scheduling service 120 can receive vGPU requests 219. Each vGPU request 219 can include a GPU memory requirement for a virtual machine 118 that originates the request. The scheduling service 120 can also determine a number of the vGPU requests 219. The scheduling service 120 can store this information as the virtual machine data 128.

In step 309, the scheduling service 120 can utilize an ILP vGPU request placement model 129 to determine GPU 115 configurations that optimize GPU 115 resources to satisfy the vGPU requests 219. The ILP vGPU request placement model 129 can minimize a number of utilized GPUs 115, and minimize a total memory of the configured vGPU profiles to accommodate the vGPU requests 219. One example of an ILP vGPU request placement model 129 can minimize Equation (1), given a set of 'N' GPUs 115 and a set of 'M' vGPU requests 219.

$$\Sigma_{j=1}^{N}\Sigma_{k=1}^{tj}p_{jk}+a_{jk}p_{jk} \quad (1)$$

Decision variable $p_{jk}$ indicates if profile 'k' is selected for GPU 'j' or not, $p_{jk} \in \{0,1\}$. Coefficient $a_{jk}$ can indicate a GPU memory reservation of each vGPU associated with profile 'k' for GPU 'j.' The objective function of equation (1) can be minimized subject to a number of constraints. The objective function of equation (1) aims to minimize the total number of physical GPUs 115 used to place the vGPU requests 219. Equation (1) can include a sum of $p_{jk}$ and $a_{jk}p_{jk}$. Minimizing $p_{jk}$ ensures that the configured vGPU profile 221 is set for an optimal number GPUs 115, or just enough GPUs 115 to satisfy all of the vGPU requests 219. Minimizing $a_{jk}p_{jk}$ ensures that the GPU memory reservations of the configured vGPU profiles 221 selected for GPUs 115 are just sufficient to fit the vGPU requests 219.

Equations (2)-(8) can include example constraints.

$$m_i r_{ij} \leq \Sigma_{k=1}^{tj} a_{jk} p_{jk} \forall (j=1 \text{ to } N, i=1 \text{ to } M) \quad (2)$$

$$\Sigma_{i=1}^{M} r_{ij} \leq \Sigma_{k=1}^{tj} n_{jk} p_{jk} \forall (j=1 \text{ to } N) \quad (3)$$

$$\Sigma_{j=1}^{N} r_{ij} = 1 \forall (i=1 \text{ to } M) \quad (4)$$

$$\Sigma_{k=1}^{tj} p_{jk} \leq 1 \forall (j=1 \text{ to } N) \quad (5)$$

$$\Sigma_{i=1}^{M}\Sigma_{j=1}^{N} r_{ij} = M \quad (6)$$

$$p_{jk} \in \{0,1\} \forall (j=1 \text{ to } N, k=1 \text{ to } t_j) \quad (7)$$

$$r_{ij} \in \{0,1\} \forall (i=1 \text{ to } M, j=1 \text{ to } N) \quad (8)$$

The constraint of equation (2) is a condition on selection of vGPU profiles. In other words, equation (2) indicates that a selected vGPU profile has a GPU memory reservation greater than or equal to that of a GPU memory requirement of a vGPU request 219 of a virtual machine 118. The constraint of equation (3) ensures that vGPU requests 219 assigned to vGPUs 222 of a GPU 115 do not exceed a number of available vGPUs for the GPU 115 at a particular vGPU profile. The constraint of equation (4) puts a condition that a single vGPU request 219 is not to be placed more than once, for example, on more than one vGPU 222. The constraint of equation (5) ensures that only one vGPU profile or no vGPU profile for a GPU 115 is configured. In other words, a GPU 115 is either not configured, or if configured then GPU 115 should have a single configured vGPU profile 221. The constraint of equation (6) ensures that the sum of vGPU requests 219 assigned to (vGPUs 222 of) GPUs 115 is equal to the total number of vGPU requests 219. In alternative cases, not all of the constraints are applied, or the constraints can be modified. For example, constraint of equation (6) can be relaxed such that vGPU requests 219 can exceed a number of GPUs 115, and the remainder of vGPU requests 219 are not assigned or are queued for future assignment. In this case, a subset of vGPU requests 219 can be assigned according to a priority such as greatest GPU memory requirement first, or lowest GPU memory requirement first. The constraints of equations (7) and (8) are constraint on the value of decision variables which ensure that they can take either 0 or 1 as their values. Decision variable $p_{jk}$ indicates if profile 'k' is selected for GPU 'j' or not. Decision variable $r_{ij}$ indicates if request 't' is placed in GPU 'j' or not. Using ILP vGPU request placement model 129, for example, the equations (1)-(8), the scheduling service 120 can determine optimal GPU 115 configurations including vGPU profiles to configure each GPUs 115.

The above objective function of equation (1) and the example constraints in equations (2)-(8) can be used to find optimal placement when number of requests M is equal to the number of GPUs N. Other constraints can be used based on the situation. For instance, if the number of requests M is greater than N, different constraints can be used. Example modified objective function and constraints for this case can be found below. If M is greater than N, the scheduling service 120 can modify the objective function of equation (1) to $\Sigma_{i=1}^{M}\Sigma_{j=1}^{N} r_{ij}$ (1m), which can be maximized. The constraint of equation (4) can be modified to $\Sigma_{j=1}^{N} r_{ij} \leq 1 \forall (i=1$ to M) (4m). The constraint of equation (6) can be modified to $\Sigma_{i=1}^{M}\Sigma_{j=1}^{N} r_{ij} \leq M$ (6m). Other modifications can also be made for other situations.

In step 312, the scheduling service 120 can configure the GPUs 115 according to the GPU 115 configurations determined using the ILP vGPU request placement model 129. The scheduling service 120 can cause a GPU 115 to have a configured vGPU profile 221. In addition, the scheduling service 120 can create the vGPUs 222 for the configured GPUs 115, according to the configured vGPU profile 221.

In step 315, the scheduling service 120 can assign the vGPU requests 219 to execute on the configured GPUs 115. In other words, the scheduling service 120 can assign each vGPU request 219 to a particular vGPU 222 of a configured GPU 115. As a result, the graphics processing portion of the virtual machine 118 can execute on the GPU 115. The virtual machine 118 can use its vGPU driver 218 to control the GPU 115.

Figure 4:
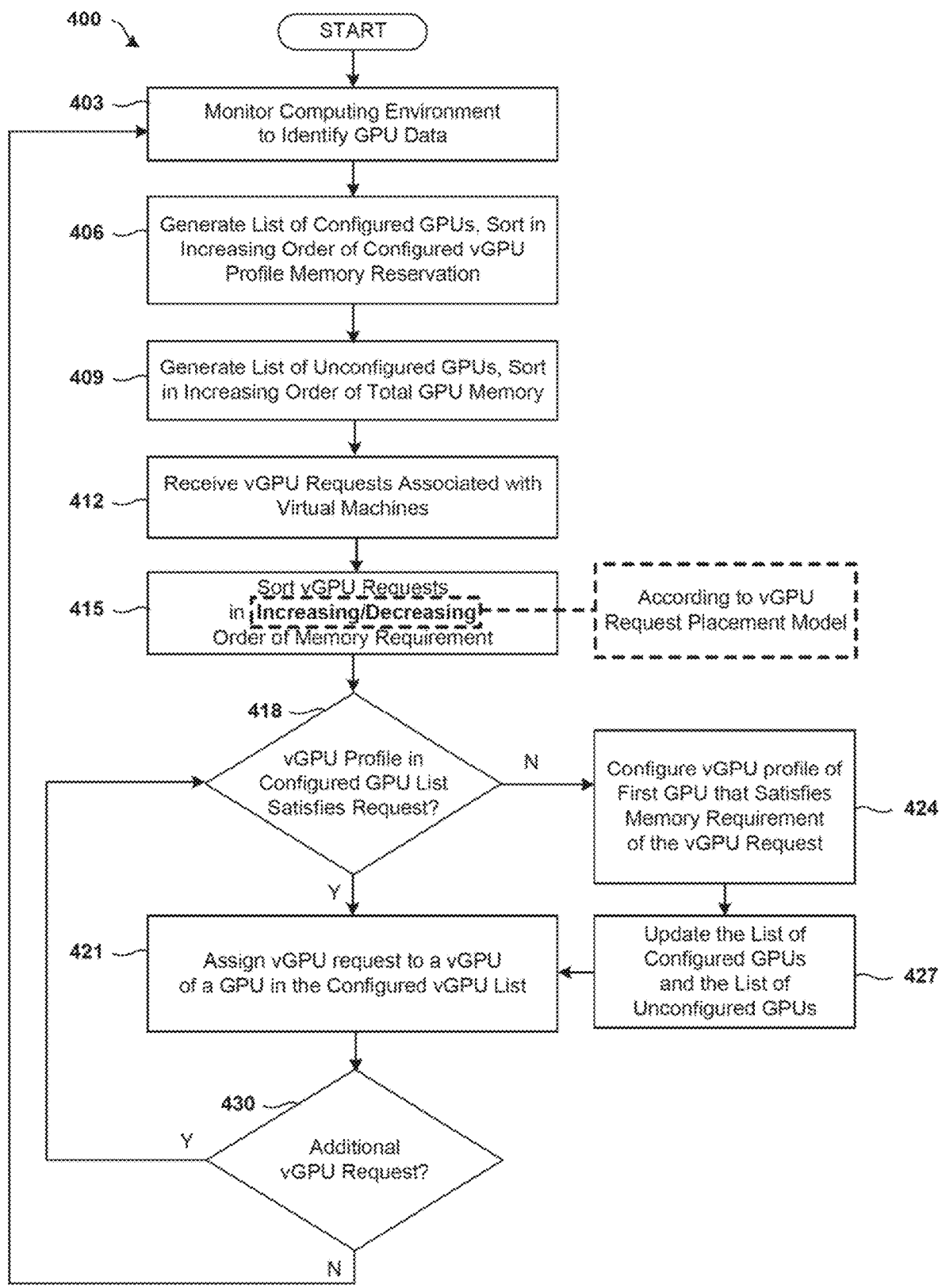
FIG. 4 is a flowchart that illustrates another example of functionalities performed using components of the networked environment.

FIG. 4 shows an example flowchart 400, describing steps that can be performed by instructions executed by the computing environment 103. Generally, the flowchart 300 describes how the scheduling service 120 can optimize usage of GPUs 115 in the computing environment 103 according to a vGPU request placement model 129. The scheduling service 120 can direct the hypervisor 135 and the vGPU manager components to perform aspects of the flowchart 400. The flowchart 400 gives an example of the scheduling service 120 using a first fit vGPU placement model 129 to optimize usage of GPUs 115. The first fit vGPU placement model 129 can include a first fit vGPU increasing requests decreasing (VIRD) heuristic, or a first fit vGPU increasing requests increasing (VIRI) heuristic. The first fit vGPU placement models 129 can be memory-aware by considering the memory requirements of a vGPU request 219 and the memory reservation of a vGPU profile 220 of a GPU 115.

In step 403, the scheduling service 120 can monitor the computing environment 103 to identify GPU data 125. The GPU data 125 can identify GPUs 115, supported vGPU profiles 220, configured vGPU profiles 221, and vGPUs 222 of the GPU 115 that have an assigned vGPU request 219 (or virtual machine 118). The scheduling service 120 can store this information as the GPU data 125. The GPU data 125 can include an identifier for each GPU 115, and can store information of the GPU 115 in association with the GPU 115 in a list, table or another data structure. The GPU data 125 can include the total amount of GPU memory of a GPU 115, and a set of supported vGPU profiles 220 for a GPU 115.

In step 406, the scheduling service 120 can generate a list of configured GPUs 115, which can be referred to as a configured GPU list. Each GPU 115 identified in the configured GPU list can be associated with a GPU memory reservation of the configured vGPU profile 221 of the GPU 115. The scheduling service 120 can sort the configured GPU list in increasing order of configured vGPU profile GPU memory reservation. While referred to as a list, the configured GPU list can be embodied as a table, a file, or any data structure that includes sorted configured GPU data. The scheduling service 120 can generate the configured GPU list using the GPU data 125, and store it in the data store 116.

In step 409, the scheduling service 120 can generate a list of unconfigured GPUs 115, which can be referred to as an unconfigured GPU list. Each GPU 115 identified in the unconfigured GPU list can be associated with a total GPU memory of the GPU 115. The scheduling service 120 can son the unconfigured GPU list in increasing order of total GPU memory. While referred to as a list, the unconfigured GPU list can be embodied as a table, a file, or any data structure that includes sorted unconfigured GPU data. The scheduling service 120 can generate the list of unconfigured GPUs 115 using the GPU data 125, and store it in the data store 116. The list of unconfigured GPUs 115 and the list of configured GPUs 115 can collectively include all available GPUs 115. The scheduling service 120 can maintain the lists such that a particular GPU 115 is included in only one of the lists. For example, if the scheduling service 120 adds a GPU 115 to the configured GPU list, the scheduling service 120 can remove the GPU 115 from the unconfigured GPU list.

In step 412, the scheduling service 120 can receive vGPU requests 219. Each vGPU request 219 can include a GPU memory requirement of a virtual machine 118 that originates the request. The scheduling service 120 can also determine a number of the vGPU requests 219. The scheduling service 120 can store this information as the virtual machine data 128. The scheduling service 120 can generate a list of vGPU requests 219, or a vGPU request list. While referred to as a list, the vGPU request list can be embodied as a table, a file, or any data structure that includes vGPU request data.

In step 415, the scheduling service 120 can sort the vGPU requests 219 of the vGPU request list in increasing order or decreasing order of GPU memory requirement. The scheduling service 120 can identify a particular first fit vGPU request placement model 129 of the computing environment 103. For example, the scheduling service 120 can determined that a VIRD heuristic is specified for the computing environment 103, and can sort the vGPU request list in decreasing order of GPU memory requirement of the vGPU requests 219. Alternatively, the scheduling service 120 can determined that a VIRI heuristic is specified for the computing environment 103, and can sort the vGPL request list in increasing order of GPU memory requirement of the vGPU requests 219. The scheduling service 120 can consider vGPU requests 219 of the vGPU request list in the sorted order.

In step 418, the scheduling service 120 can determine whether a configured vGPU profile 221 of a GPU 115 in the configured GPU list satisfies a particular vGPU request 219, for example, of the vGPU request list. A configured vGPU profile can satisfy the particular vGPU request 219 if the GPU memory reservation for the configured vGPU profile 221 is greater than or equal to the GPU memory requirement of the particular vGPU request 219. If a configured vGPU profile 221 satisfies the vGPU request 219, the process can move to step 421. If no configured vGPU profile 221 of the configured GPU list satisfies the vGPU request 219, the process can move to step 424.

In step 421, the scheduling service 120 can assign the vGPU request 219 to a vGPU 222 of a GPU 115 in the configured GPU list. The scheduling service 120 can compare the vGPU request 219 to each GPU 115 in the configured GPU list in order and select a first GPU 115 that has a configured vGPU profile 221 that satisfies the GPU memory requirement of the vGPU request 219. The scheduling service 120 can assign the vGPU request 219 to the selected GPU 115. The virtual machine 118 can execute is graphics processing load using the selected GPU 115.

In step 424, the scheduling service 120 can configure a vGPU profile of a first GPU 115, from the unconfigured GPU list, that satisfies the GPU memory requirement of the vGPU request 219. Because none of the configured GPUs 115 of the configured GPU list are currently configured with a vGPU profile having sufficient GPU memory, the scheduling service 120 can configure a vGPU profile from the unconfigured GPU list. The scheduling service 120 can compare the vGPU request 219 to each GPU 115 in the unconfigured GPU list in order and select a first GPU 115 that has a total GPU memory that is equal to or greater than the GPU memory requirement of the vGPU request 219.

The scheduling service 120 can configure the selected GPU 115 to have a configured vGPU profile 221 that is equal to or greater than the GPU memory requirement of the vGPU request 219. In order to most efficiently configure the selected GPU 115, the scheduling service 120 can identify the supported vGPU profiles 220 of the selected GPU 115. The scheduling service 120 can identify the supported vGPU profiles 220 from the unconfigured GPU list, or by analyzing the GPU 115. In some cases, the unconfigured GPU list can include a sorted sublist or set of supported vGPU profiles 220 for each GPU. In other cases, the scheduling service 120 can determine the supported vGPU profiles 220 based on the total GPU memory of the selected GPU 115. Generally, a GPU 115 can support division of its total GPU memory evenly in units of multiples of 1 GB. The scheduling service 120 can determine the supported vGPU profiles 220 based on multiples of 1 GB that evenly divide the total GPU memory.

Once the supported vGPU profiles 220 are identified, the scheduling service 120 can identify a smallest supported vGPU profile 220 that is equal to or greater than the GPU memory requirement of the vGPU request 219. In some examples, the scheduling service 120 can compare the vGPU request 219 to each supported vGPU profile 220 in a supported vGPU list, and select a first supported vGPU profile 220 that has a GPU memory reservation that is equal to or greater than the GPU memory requirement of the vGPU request 219. As a result, the selected supported vGPU profile 220 can have a lowest GPU memory reservation that satisfies the vGPU request 219. The scheduling service 120 can configure the GPU 115 to use the selected supported vGPU profile 220. In other words, the selected supported vGPU profile 220 can become the configured vGPU profile 221 of the GPU 115.

In step 427, the scheduling service 120 can update the configured GPU list and the unconfigured GPU list. Because the scheduling service 120 configured a GPU 115 from the unconfigured GPU list, the scheduling service 120 can remove it from the unconfigured GPU list and add it to the configured GPU list. The scheduling service 120 can include its configured vGPU profile 221 in the configured GPU list entry for the GPU 115. The scheduling service 120 can add the GPU 115 to the configured GPU list in a location that maintains the increasing order of configured vGPU profile GPU memory reservation. In other situations, the scheduling service 120 can add the GPU 115 to the configured GPU list in any location, and re-sort the configured GPU list in increasing order of configured vGPU profile GPU memory reservation.

In step 430, the scheduling service 120 can determine whether to assign any additional vGPU requests 219. For example, if there are additional vGPU requests 219 in the vGPU request list, the scheduling service 120 can move to step 418 and analyze the next vGPU requests 219 for assignment according to the vGPU request placement model 129. However, if there are no additional vGPU requests 219 to consider, then the scheduling service 120 can move to step 403.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drives, solid-state drives, USB flash drives, memory cards, optical discs such as compact discs (CDs) or digital versatile discs (DVDs), floppy disks, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The flowchart shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or in machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system comprising:
at least one computing device comprising at least one processor and at least one data store;
machine readable instructions stored in the at least one data store, wherein the instructions, when executed by the at least one processor, cause the at least one computing device to at least:
identify graphics processing unit (GPU) data for a plurality of virtual GPU (vGPU) enabled GPUs;
generate, based on the GPU data, a configured GPU list that sorts a plurality of configured GPUs in increasing order of respective vGPU profile memory reservations, wherein a respective configured GPU of the configured GPU list is configured to use a respective vGPU profile that specifies a respective vGPU profile memory reservation, and the respective configured GPU is sorted using the respective vGPU profile memory reservation;

generate, based on the GPU data, an unconfigured GPU list that sorts a plurality of unconfigured GPUs in increasing order of respective total GPU memories, wherein a respective unconfigured GPU of the unconfigured GPU list supports a plurality of vGPU profiles, is unconfigured with any of the vGPU profiles, and is sorted using a respective total GPU memory for the respective unconfigured GPU;

receive a vGPU request comprising a GPU memory requirement; and assign the vGPU request to a vGPU of a GPU that satisfies the GPU memory requirement, wherein the GPU is a first GPU that satisfies the GPU memory requirement in an ordered comparison of the GPU requirement to respective vGPU profile memory reservations GPU memories of the configured GPU list, and the respective total GPU memories of the unconfigured GPU list.

2. The system of claim 1, wherein the GPU is one of the plurality of configured GPUs of the configured GPU list, and the GPU memory requirement from the vGPU request is less than or equal to a memory reservation of a vGPU profile for the GPU.

3. The system of claim 1, wherein the instructions, when executed by the at least one processor, cause the at least one computing device to at least:

identify the GPU from the unconfigured GPU list, wherein the respective total GPU memory for the respective unconfigured GPU is greater than or equal to the GPU memory requirement; and configure the GPU to a particular vGPU profile that is selected based on the particular vGPU profile corresponding to a lowest GPU memory reservation that satisfies the GPU memory requirement among the plurality of vGPU profiles supported by the GPU.

4. The system of claim 1, wherein the instructions, when executed by the at least one processor, cause the at least one computing device to at least:

in response to the GPU being configured to a particular supported vGPU profile, remove the GPU from the unconfigured GPU list and add the GPU to the configured GPU list, wherein the increasing order of configured vGPU profile memory is maintained for the configured GPU list.

5. The system of claim 1, wherein the instructions, when executed by the at least one processor, cause the at least one computing device to at least:

receive a plurality of vGPU requests comprising corresponding GPU memory requirements;

generate a vGPU request list based on the plurality of vGPU requests, wherein the vGPU request list is sorted in increasing order of the corresponding GPU memory requirements of the plurality of vGPU requests; and assign the plurality of vGPU requests to GPUs, wherein the plurality of vGPU requests are assigned in order according to the vGPU request list.

6. The system of claim 1, wherein the instructions, when executed by the at least one processor, cause the at least one computing device to at least:

receive a plurality of vGPU requests comprising corresponding GPU memory requirements;

generate a vGPU request list based on the plurality of vGPU requests, wherein the vGPU request list is sorted in decreasing order of the corresponding GPU memory requirements of the plurality of vGPU requests; and assign the plurality of vGPU requests to GPUs, wherein the plurality of vGPU requests are assigned in order according to the vGPU request list.

7. The system of claim 1, wherein the unconfigured GPU list is sorted in increasing order of the respective total GPU memories.

8. A method performed by at least one computing device executing machine-readable instructions, the method comprising:

identifying graphics processing unit (GPU) data for a plurality of virtual GPU (vGPU) enabled GPUs;

generating, based on the GPU data, a configured GPU list that sorts a plurality of configured GPUs in increasing order of respective vGPU profile memory reservations, wherein a respective configured GPU of the configured GPU list is configured to use a respective vGPU profile that specifies a respective vGPU profile memory reservation, and the respective configured GPU is sorted using the respective vGPU profile memory reservation;

generating, based on the GPU data, an unconfigured GPU list that sorts a plurality of unconfigured GPUs in increasing order of respective total GPU memories, wherein a respective unconfigured GPU of the unconfigured GPU list supports a plurality of vGPU profiles, is unconfigured with any of the vGPU profiles, and is sorted using a respective total GPU memory for the respective unconfigured GPU;

receiving a vGPU request comprising a GPU memory requirement; and assigning the vGPU request to a vGPU of a GPU that satisfies the GPU memory requirement, wherein the GPU is a first GPU that satisfies the GPU memory requirement in an ordered comparison of the GPU requirement to respective vGPU profile memory reservations GPU memories of the configured GPU list, and the respective total GPU memories of the unconfigured GPU list.

9. The method of claim 8, wherein the GPU is one of the plurality of configured GPUs of the configured GPU list, and the GPU memory requirement from the vGPU request is less than or equal to a memory reservation of a vGPU profile for the GPU.

10. The method of claim 8, further comprising:

identifying the GPU from the unconfigured GPU list, wherein the respective total GPU memory for the respective unconfigured GPU is greater than or equal to the GPU memory requirement; and configuring the GPU to a particular vGPU profile that is selected based on the particular vGPU profile comprises corresponding to a lowest GPU memory reservation that satisfies the GPU memory requirement among the plurality of vGPU profiles supported by the GPU.

11. The method of claim 8, further comprising:

in response to the GPU being configured to a particular supported vGPU profile, removing the GPU from the unconfigured GPU list, and adding the GPU to the configured GPU list, wherein the increasing order of the configured vGPU profile memory is maintained for the configured GPU list.

12. The method of claim 8, further comprising:

receiving a plurality of vGPU requests comprising corresponding GPU memory requirements;

generating a vGPU request list based on the plurality of vGPU requests, wherein the vGPU request list is sorted in increasing order of the corresponding GPU memory requirements of the plurality of vGPU requests; and assigning the plurality of vGPU requests to GPUs, wherein the plurality of vGPU requests are assigned in order according to the vGPU request list.

13. The method of claim 8, further comprising:
receiving a plurality of vGPU requests comprising corresponding GPU memory requirements;
generating a vGPU request list based on the plurality of vGPU requests, wherein the vGPU request list is sorted in decreasing order of the corresponding GPU memory requirements of the plurality of vGPU requests; and
assigning the plurality of vGPU requests to GPUs, wherein the plurality of vGPU requests are assigned in order according to the vGPU request list.

14. The method of claim 8, wherein the unconfigured GPU list is sorted in increasing order of the respective total GPU memories, and the unconfigured GPU list maps the respective unconfigured GPU to a set of supported GPU profiles sorted in increasing order of profile GPU memory reservation.

15. A non-transitory computer-readable medium comprising machine readable instructions, wherein the instructions, when executed by at least one processor, cause at least one computing device to at least:
identify graphics processing unit (GPU) data for a plurality of virtual GPU (vGPU) enabled GPUs;
generate, based on the GPU data, a configured GPU list that sorts a plurality of configured GPUs in increasing order of respective vGPU profile memory reservations, wherein a respective configured GPU of the configured GPU list is configured to use a respective vGPU profile that specifies a respective vGPU profile memory reservation, and the respective configured GPU is sorted using the respective vGPU profile memory reservation;
generate, based on the GPU data, an unconfigured GPU list that sorts a plurality of unconfigured GPUs in increasing order of respective total GPU memories, wherein a respective unconfigured GPU of the unconfigured GPU list supports a plurality of vGPU profiles, is unconfigured with any of the vGPU profiles, and is sorted using a respective total GPU memory for the respective unconfigured GPU;
receive a vGPU request comprising a GPU memory requirement; and
assign the vGPU request to a vGPU of a GPU that satisfies the GPU memory requirement, wherein the GPU is a first GPU that satisfies the GPU memory requirement in an ordered comparison of the GPU requirement to respective vGPU profile memory reservations GPU memories of the configured GPU list, and the respective total GPU memories of the unconfigured GPU list.

16. The non-transitory computer-readable medium of claim 15, wherein the GPU is one of the plurality of configured GPUs of the configured GPU list, and the GPU memory requirement from the vGPU request is less than or equal to a memory reservation of a vGPU profile for the GPU.

17. The non-transitory computer-readable medium of claim 15, wherein the instructions, when executed by the at least one processor, cause the at least one computing device to at least:
identify the GPU from the unconfigured GPU list, wherein the respective total GPU memory for the respective unconfigured GPU is greater than or equal to the GPU memory requirement; and
configure the GPU to a particular vGPU profile that is selected based on the particular vGPU profile corresponding to a lowest GPU memory reservation that satisfies the GPU memory requirement among the plurality of vGPU profiles supported by the GPU.

18. The non-transitory computer-readable medium of claim 15, wherein the instructions, when executed by the at least one processor, cause the at least one computing device to at least:
in response to the GPU being configured to a particular supported vGPU profile, remove the GPU from the unconfigured GPU list and add the GPU to the configured GPU list, wherein the increasing order of configured vGPU profile memory is maintained for the configured GPU list.

19. The non-transitory computer-readable medium of claim 15, wherein the instructions, when executed by the at least one processor, cause the at least one computing device to at least:
receive a plurality of vGPU requests comprising corresponding GPU memory requirements;
generate a vGPU request list based on the plurality of vGPU requests, wherein the vGPU request list is sorted in increasing order of the corresponding GPU memory requirements of the plurality of vGPU requests; and
assign the plurality of vGPU requests to GPUs, wherein the plurality of vGPU requests are assigned in order according to the vGPU request list.

20. The non-transitory computer-readable medium of claim 15, wherein the instructions, when executed by the at least one processor, cause the at least one computing device to at least:
receive a plurality of vGPU requests comprising corresponding GPU memory requirements;
generate a vGPU request list based on the plurality of vGPU requests, wherein the vGPU request list is sorted in decreasing order of the corresponding GPU memory requirements of the plurality of vGPU requests; and
assign the plurality of vGPU requests to GPUs, wherein the plurality of vGPU requests are assigned in order according to the vGPU request list.

* * * * *